Dec. 3, 1940.    M. A. CARMODY    2,223,781
TRACTOR-SEMITRAILER COMBINATION
Filed Dec. 6, 1939    3 Sheets-Sheet 1

INVENTOR
MICHAEL A. CARMODY
BY
Beau, Brooks, Buckley & Beau.
ATTORNEYS

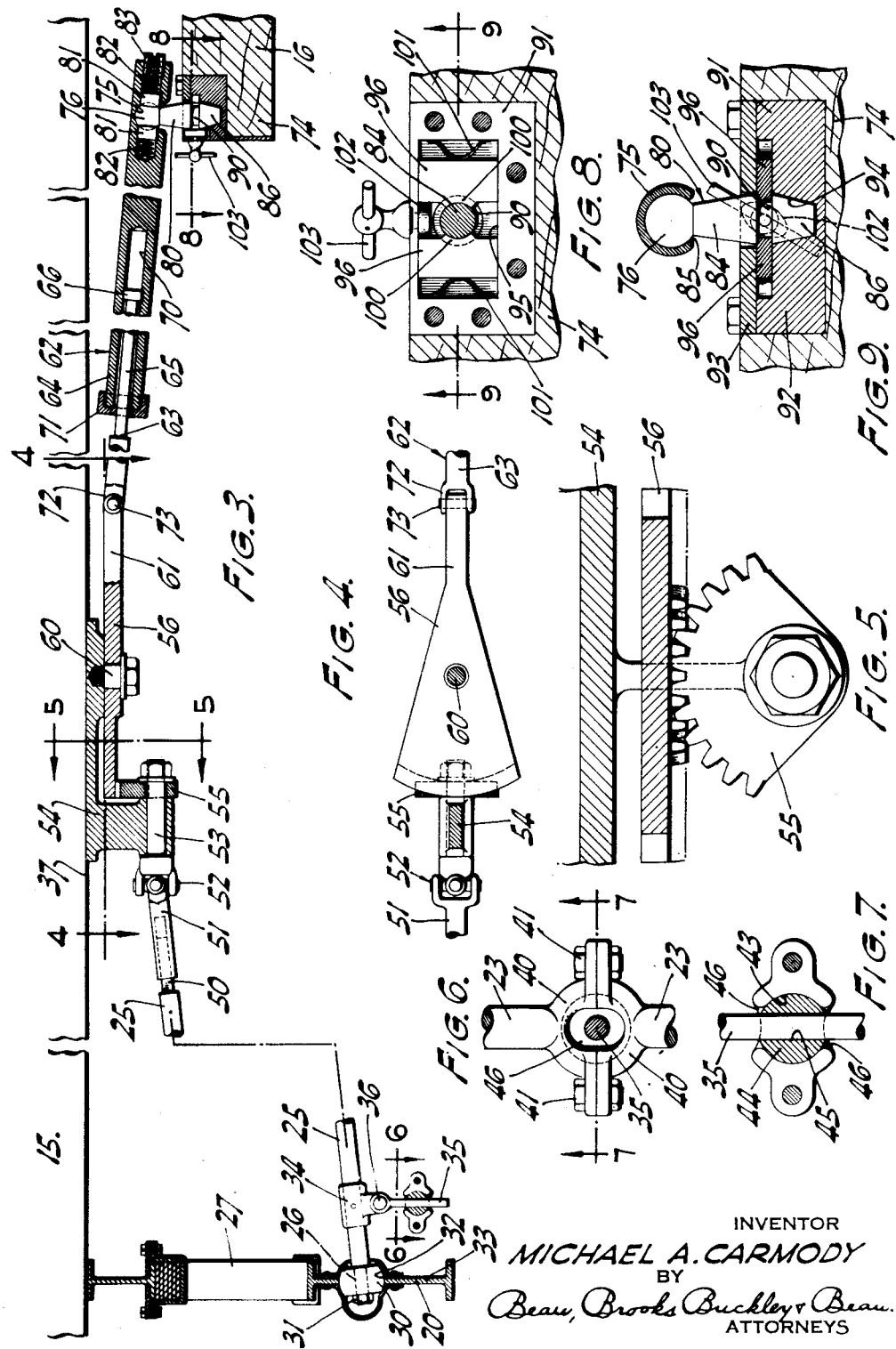

Dec. 3, 1940.  M. A. CARMODY  2,223,781
TRACTOR-SEMITRAILER COMBINATION
Filed Dec. 6, 1939  3 Sheets-Sheet 3
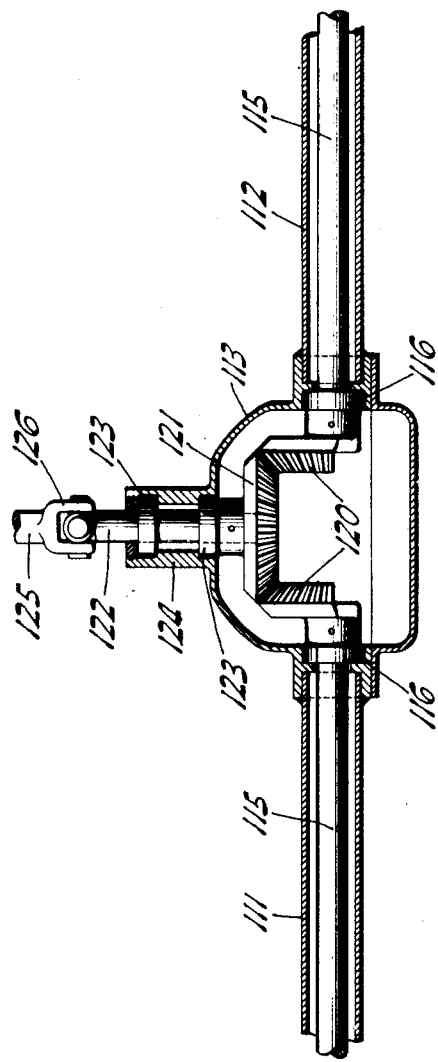
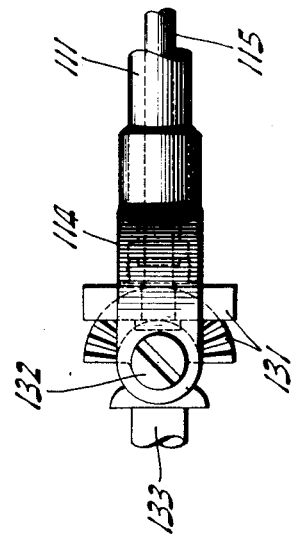
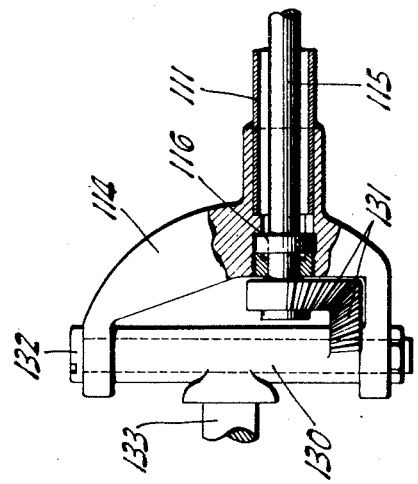
INVENTOR
MICHAEL A. CARMODY
BY
Beau, Brooks, Buckley & Beau.
ATTORNEYS Patented Dec. 3, 1940

2,223,781

UNITED STATES PATENT OFFICE 2,223,781

TRACTOR-SEMITRAILER COMBINATION

Michael A. Carmody, Buffalo, N. Y., assignor of one-half to Henry Schaefer, Jr., Buffalo, N. Y.

Application December 6, 1939, Serial No. 307,847

4 Claims. (Cl. 280—33.55)

My invention relates in general to trailer trucks and more particularly to a steering mechanism for tractor-semitrailer combinations.

It is well known to those skilled in the art that semitrailer trucks used at present are rather large and cumbersome to handle and when rounding a corner in a road or street, it is necessary that they make a large sweep in order that the rear wheels of the semitrailer will clear the curb or the edge of the road. In some cases the semitrailer is so large and its wheels so far removed from the rear driving wheels of the power unit that it is necessary for the driver to go backwardly and forwardly repeatedly in order that the turn may be made.

The principal object of my invention has been to overcome the disadvantages above noted and to provide a steering mechanism at the rear of the semitrailer.

Another object has been to provide a steering mechanism which will be operated by the turning of the power unit of the tractor-semitrailer combination.

It has been a further object of my invention to provide detachable means for coupling the steering mechanism with the power unit of the semitrailer truck.

Moreover, my invention contemplates the provision of means for quickly locking and unlocking the coupling pin of the steering mechanism with suitable chuck means carried by the power unit.

Furthermore, my invention is relatively inexpensive to manufacture, and is of such nature that it can be conveniently and easily manipulated by the driver of the truck.

The above objects and advantages have been accomplished by the device shown in the accompanying drawings, of which:

Fig. 3 is an enlarged, side elevation of my steering mechanism showing parts broken away for clearness of illustration.

Fig. 4 is a fragmentary, sectional, plan view taken on line 4—4 of Fig. 3.

Fig. 5 is an enlarged, end, sectional view taken on line 5—5 of Fig. 3.

Fig. 6 is an enlarged, fragmentary, sectional plan view of the bearing between the steering pin and the connecting rod, taken on line 6—6 of Fig. 3.

Fig. 7 is a sectional view of parts shown in Fig. 6 and is taken on line 7—7 of Fig. 6.

Fig. 8 is an enlarged, fragmentary, sectional plan view taken on line 8—8 of Fig. 3, showing the coupling pin chuck.

Fig. 9 is a fragmentary, sectional view of parts shown in Fig. 8 and taken on line 9—9 of that figure.

Fig. 10 is a sectional plan view of a modified form of steering mechanism.

Fig. 11 is a fragmentary view of the steering knuckle construction used in connection with the form of invention shown in Fig. 10.

Fig. 12 is a fragmentary, plan view of the parts of the apparatus shown in Fig. 11.

As hereinbefore pointed out, my invention is applicable to the semitrailer type of truck, in which type of vehicle there may be a number of semitrailers 15 with but one power unit 16, which semitrailer parts are, as well known, detached while being loaded and substantially during the time that the power unit is being used to transport another semitrailer. My device, therefore, must be of such a nature that it can be quickly attached to or detached from the power unit of the tractor-semitrailer combination.

Figure 1:
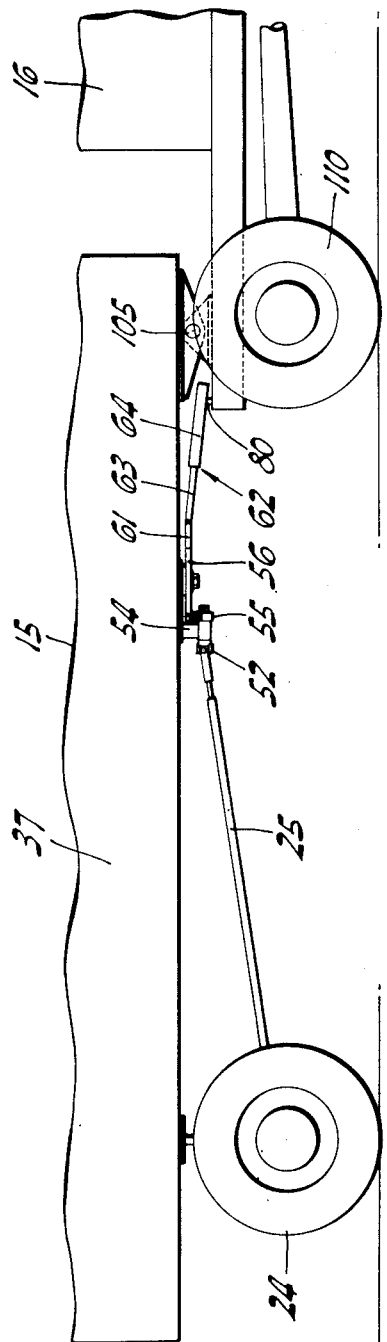
Fig. 1 is a fragmentary, side elevation of a tractor-semitrailer combination, somewhat in diagram.
Figure 2:
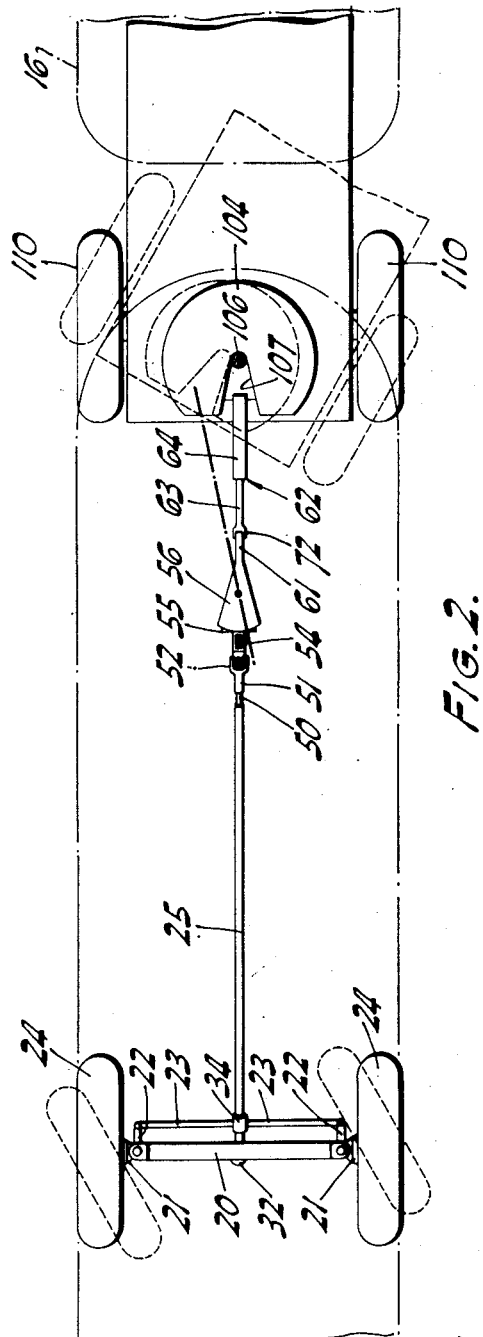
Fig. 2 is a plan view of the same.

In Figs. 1, 2 and 3 of the drawings, where I have shown my invention attached to a semitrailer truck, for clearness of illustration, various standard parts of the semitrailer and power unit have been omitted, since they do not form a part of my invention.

In carrying out my invention, I provide the semitrailer with an axle 20 preferably of I-beam construction, at each end of which I provide a steering knuckle 21 of much the same construction as those employed in automotive constructions of well-known design. Each of these steering knuckles is provided with a steering arm 22, which arms are connected together by means of a connecting rod 23 in well known manner. The semitrailer is mounted upon rear wheels 24, and by means of the connecting rod 23 and the steering knuckles 21, these wheels are moved in unison to any one of a number of positions, one of which being indicated by the dotted lines in Fig. 2. A suitable spring 27 is carried by the axle.

Mounted preferably above the connecting rod 23 is the steering shaft 25 of my device. This shaft extends longitudinally of the semitrailer 15, and has its rear end provided with a reduced peripheral portion 26 upon which is mounted a spherical bearing 30, held in place upon the shaft preferably by means of a nut 31.

This spherical bearing is mounted within a spherical socket 32 formed preferably in the web 33 of the rear axle 20 and provides for universal bearing support of the rear end of the steering shaft. A steering pin bracket 34 is rigidly mounted upon the steering shaft so that it will be rotated together with the shaft. This bracket is arranged above the connecting rod 23 and carries a downwardly extending steering pin 35. This pin is preferably pivoted at 36 to the bracket so as to move in a plane substantially parallel to the axis of the steering shaft, whereby the change in angular relation between the pin and the shaft owing to a changing position of the axle with respect to the semitrailer body 37 will be compensated for. The connecting rod 23 is preferably separated at its central portion where it is formed with two clamping sockets 40 fastened together preferably by bolts 41 and formed in its contiguous faces with a spherical socket 43 within which is mounted a steering pin ball 44. The ball is formed with a centrally arranged aperture 45 through which the steering pin 35 passes. The steering pin is slidable within the ball so as to compensate for changing distances between the ball and the shaft due to a change of angle when operating and also to compensate for any difference in distance between the connecting rod and the steering shaft owing to movement between the axle and the trailer body. The clamping sockets are provided in their upper and lower walls with enlarged and elongated apertures 46 which provide for the free movement of the steering pin in relation to the connecting rod to permit the movements above referred to.

The steering shaft has its forward end 50 preferably reduced in diameter and connected in slidable manner with a shaft sleeve 51. This sleeve and shaft end are preferably splined so as to permit relative axial movement of these parts but to prevent relative rotation thereof, whereby all oscillatory movement imparted to the sleeve 51 will be transferred to the shaft. The sleeve is connected to or made a part of a universal joint 52, the other portion of which is carried by a gear shaft 53. This gear shaft is rotatably carried by a gear bracket 54 which is suitably secured to the underside of the semitrailer 15. Mounted on the forward end of the gear shaft 53 is a steering gear 55. This gear is preferably segmental, as shown in Fig. 5, with its teeth extending upwardly and meshing with a steering gear segment 56. The steering gear segment is pivotally mounted upon a pivot screw 60 which is suitably carried by the gear bracket 54, in such position as to permit movement of the segment in a substantially horizontal plane on each side of the longitudinal centerline of the semitrailer. The steering gear segment is formed with a forwardly extending lever 61 to which the steering gear arm 62 of my device is pivotally attached. This arm comprises a rod 63 and a sleeve 64 which are in telescoped arrangement as shown in Fig. 3 in order to compensate for the necessary lengthening and shortening of the rod due to the angular movement of the power unit of the truck. The rod is preferably formed with a reduced portion 65 formed on its inner end with a screwthreaded collar 66 which moves in the enlarged bore 70 of the sleeve. A screwthreaded nut 71 is preferably formed at the outer end of the sleeve and is provided with an aperture which fits the portion 65 whereby to prevent disengagement of the parts. The rod 63 and sleeve 62 may be, if desired, provided with a spline so as to prevent relative rotation of the two parts, thus maintaining the sleeve part 64 in predetermined position. The rod 63 is formed at its rear end with a clevis 72 which engages the pivot pin 73 carried by the arm 61 of the gear segment. The pin 73 is arranged preferably in a horizontal plane so that the movement of the steering gear arm relative to the steering gear segment will be only in a vertical plane.

The sleeve portion 64 of the steering gear arm is extended forwardly over the rear end 74 of the power unit 16, where it is provided with a socket portion 75 for the reception of the spherical portion 76 of the coupling pin 80. The sleeve 64 is provided at each side of the socket portion with a spherically-faced plug 81, each of which is spring-pressed by means of a spring 82. A screw plug 83 is engaged with the outer end of the sleeve whereby the plugs 81 are held in spring-pressed engagement with the ball 76. The coupling pin is provided with a stem 84 which passes through an opening 85 in the socket portion 75 of the arm. The stem 84 extends downwardly and is provided with a tapered lower end 86 immediately above which is formed an annular recess 90.

Carried at the rear end of the power unit 16 of the semitrailer truck is a socket member 91 comprising a body part 92 and a cover plate 93. The body part is provided with a socket 94, preferably tapered in form to fit the tapered end 86 of the coupling pin. As shown in Fig. 2, the socket 94 is disposed back of the kingpin 106 and in spaced relation, and it is substantially coincident with a line drawn through the centers of the kingpin 106 and the gear segment bolt 60 when the truck and semitrailer are in alignment for forward movement. Formed in the body part of the socket member is a recess or groove 95 in which is slidably mounted two chuck plates 96, each of which is provided with an extension 100 which engages with the groove 90 formed in the coupling pin. Each of these chuck plates is preferably pressed inwardly by means of a spring 101. When the plates are in the position shown in Figs. 8 and 9, the extensions 100 are engaged with the recess 90 and the tapered end 86 of the coupling pin is firmly held in engagement with the recess 94. In order to release the coupling pin, it is necessary to force the chuck plates away from each other and out of engagement with the groove 90, and this is accomplished preferably by means of a release cam 102 which is mounted within the body part 92 of the socket member between the plates 96. The cam is so designed that, when rotated, its lobes will cause the chuck plates to be moved away from each other, thus withdrawing the projections 100 from the groove and permitting the removal of the coupling pin 80. The cam is operated preferably by means of a handle 103 which is rotatably mounted within the socket member and upon the cam shaft.

As is well known, the power unit 16 of a semitrailer truck is provided with a trailer coupler plate 104 which acts as a fifth wheel for the truck. This plate is mounted upon pivot pins 105 which are so located that the plate may be tilted to facilitate assembling of the semitrailer to the power unit and to provide for the necessary flexible connection between the two parts. The coupler plate is provided with the customary slot 107 with which the kingbolt 106 engages. Obviously, the position of the coupler plate 104 and the kingpin 106 may be located anywhere with respect to the traction wheels 110 of the power unit but, in carrying out my invention, it is important that the coupling pin 80 of my device be located some distance behind the kingpin 106. Under these circumstances, it will be clear that when the power unit is turned with respect to the semitrailer part 15, as for instance to the position shown in dotted lines in Fig. 2, the power unit will be rotated around the kingpin 106. This movement will cause the coupling pin 80 to be carried around in an arcuate path in clockwise direction, as viewed from Fig. 2, thus moving the steering gear arm 62 around on its pivot screw 68 to the position shown by the dot-and-dash line in Fig. 2. This movement will, of course, cause the steering gear segment to be oscillated, and this motion will be transmitted to the steering shaft 25 through the gear 55, the gear shaft 53, the universal joint 52 and the shaft sleeve 51. This rotary or oscillatory motion of the shaft 25 is converted into reciprocatory movement by means of the steering pin 35 which, as hereinbefore pointed out, is engageable with the connecting rod 23. As the connecting rod 23 is moved in a direction to bring the parts to the position shown in Fig. 2, the wheels 24 of the semitrailer will be moved to the dotted-line position as shown in this figure. The parts are, obviously, so arranged that when the traction wheels 110 of the power unit are moved clockwise to the dotted-line position shown in Fig. 2, the semitrailer wheels 24 will be moved counterclockwise so that as the power unit is being turned to make a right-hand turn, the rear wheels will be moved in such direction as to substantially track with the curved path through which the traction wheels are moving and serve to carry the rear end of the semitrailer 15 around in a curved path, the radius of which is such as to make it possible to conveniently turn the truck around the ordinary street or road corner. Since the socket 94 carrying the coupling pin 80 is centrally located behind the kingpin 106, it is obvious that substantially equal and maximum movement of the power unit in either direction may be brought about. Furthermore, it is obvious that the coupling pin can swing outwardly around the kingpin only a limited amount owing to the arcuate movement of the pin or until the centerline of the steering arm is tangent to the circle of such arcuate movement. Such an arrangement permits the power unit to be freely swung around close to the semitrailer when parking, as is customary.

Referring now to Figs. 10 to 12, inclusive, I show a modified form of structure for coupling the steering shaft to the rear wheels of the semitrailer part of the vehicle. The semitrailer axle in this form of invention is made in two parts 111 and 112, formed of tubing, the inner ends of each of which being connected to a centrally arranged housing 113. There is provided at the outer end of each of the axle parts a steering knuckle yoke 114. Obviously, the casing 113 and the steering knuckle yokes are securely and non-rotatably fastened to the axle parts 111 and 112. Mounted within each of the axle parts is an axle shaft 115 which is rotatably supported by suitable bearings 116 carried by the yokes and the housing. On the inner end of each of these axle shafts is mounted a segmental bevel gear 120, and meshing with these gears is an axle bevel gear 121. This last mentioned gear is carried by a shaft 122, suitably mounted in bearings 123 carried by an extension 124 of the casing. The shaft 122 is connected to the steering shaft 125 by means of a universal joint 126.

A steering knuckle 130 is carried by each of the yokes 114 and each of these knuckles is connected to the outer end of one of the axle shafts 115 by means of a pair of bevel gears 131. Each of the steering knuckles 130 is mounted upon a kingpin 132 in a manner well known to those skilled in the art and each steering knuckle is provided with a spindle 133 upon which is mounted a wheel (not shown). In the form of invention just above described, the steering knuckles are actuated by the rotary or oscillatory movement of the steering shaft 125 through the shaft 122, the gears 121 and 120, the axle shafts 115, and the bevel gears 131. The parts are so located that movement of the steering shaft will cause the steering wheels of the semitrailer to be moved in relation to the power unit of the truck in a manner similar to the form of invention first described.

It is obvious that, when attaching a semitrailer to a power unit, the operator must be able to move the steering arm so as to bring about a registration of the coupling pin 80 with the socket member on the rear of the power unit. In order that this may be accomplished with ease, the parts of my device are so designed as to enable a man to produce sufficient leverage upon the steering arm, even though it involves movement of the steering wheels of the semitrailer to bring about the coupling just referred to.

Obviously, some modifications of the details herein shown and described may be made without departing from the spirit of the invention or the scope of the appended claims, and I do not, therefore, wish to be limited to the exact embodiment herein shown and described, the form shown being merely a preferred embodiment thereof.

Having thus described my invention, what I claim is:

1. In a tractor-semitrailer combination having a connection therebetween, including a kingpin, wheels supporting said semitrailer, means interconnecting said wheels for steering, means to steer said wheels as said tractor assumes an angle with respect to said semitrailer including, a shaft connected to and extending forwardly from the steering means, a steering arm removably connected at one end to said tractor behind said kingpin and pivotally connected to said trailer adjacent its other end, said kingpin and the connections of said arm being aligned when the tractor and semitrailer are aligned, and means interconnecting said shaft and arm so constructed and arranged that the trailer wheels are turned in a direction opposite to that assumed by the tractor.

2. In a tractor-semitrailer combination having a connection therebetween, including a kingpin, wheels supporting said semitrailer, means interconnecting said wheels for steering, means to steer said wheels as said tractor assumes an angle with respect to said semitrailer including, a shaft connected to and extending forwardly from the steering means, a second shaft rotatably carried by said tractor, means interconnecting said shafts, a steering arm removably connected at one end to said tractor behind said kingpin and pivotally connected to said trailer adjacent its other end, said kingpin and the connections of said arm being aligned when the tractor and semitrailer are aligned, and gear means interconnecting said second shaft and said arm so constructed and arranged that the trailer wheels are turned in a direction opposite to that assumed by the tractor.

3. In a tractor-semitrailer combination having a connection therebetween, including a kingpin, wheels supporting said semitrailer, means interconnecting said wheels for steering, means to steer said wheels as said tractor assumes an angle with respect to said semitrailer including, a shaft connected to and extending forwardly from the steering means, a second shaft rotatably carried by said trailer, a steering arm removably connected at one end to said tractor behind said kingpin and pivotally connected to said trailer adjacent its other end, said kingpin and the connections of said arm being aligned when the tractor and semitrailer are aligned, said arm being provided with a hinge permitting the first mentioned end to move in a vertical plane, and means interconnecting said shafts and arm so constructed and arranged that the trailer wheels are turned in a direction opposite to that assumed by the tractor.

4. In a tractor-semitrailer combination having a connection therebetween, including a kingpin, wheels supporting said semitrailer, means interconnecting said wheels for steering, means to steer said wheels as said tractor assumes an angle with respect to said semitrailer including, a shaft connected to and extending forwardly from the steering means, a telescopic steering arm removably connected at one end to said tractor behind said kingpin and pivotally connected to said trailer adjacent its other end, said kingpin and the connections of said arm being aligned when the tractor and semitrailer are aligned, and means interconnecting said shaft and arm so constructed and arranged that the trailer wheels are turned in a direction opposite to that assumed by the tractor.

MICHAEL A. CARMODY.